United States Patent
Shin et al.

(10) Patent No.: US 10,683,208 B2
(45) Date of Patent: Jun. 16, 2020

(54) MXENE NANOSHEET AND MANUFACTURING METHOD THEREOF

(71) Applicant: Samsung Electronics Co., Ltd., Suwon-si, Gyeonggi-do (KR)

(72) Inventors: Hyeonjin Shin, Suwon-si (KR); Hyoyoung Lee, Suwon-si (KR); Yeoheung Yoon, Suwon-si (KR)

(73) Assignees: Samsung Electronics Co., Ltd., Gyeonggi-do (KR); Research & Business Foundation Sungkyunkwan University, Gyeonggi-do (KR)

( * ) Notice: Subject to any disclaimer, the term of this patent is extended or adjusted under 35 U.S.C. 154(b) by 840 days.

(21) Appl. No.: 15/222,345

(22) Filed: Jul. 28, 2016

(65) Prior Publication Data
US 2017/0088429 A1  Mar. 30, 2017

(30) Foreign Application Priority Data
Sep. 24, 2015 (KR) .................. 10-2015-0135766

(51) Int. Cl.
*B32B 9/00* (2006.01)
*C01B 32/921* (2017.01)
(Continued)

(52) U.S. Cl.
CPC ............ *C01B 32/921* (2017.08); *C01B 21/06* (2013.01); *B82Y 30/00* (2013.01); *B82Y 40/00* (2013.01);
(Continued)

(58) Field of Classification Search
CPC .......... B32B 9/00; Y10T 428/30; B82Y 30/00
(Continued)

(56) References Cited

U.S. PATENT DOCUMENTS

| 8,901,620 B2 | 12/2014 | Lee et al. |
| 2013/0139446 A1 | 6/2013 | Malik |
| 2014/0044890 A1 | 2/2014 | Ling et al. |

FOREIGN PATENT DOCUMENTS

| KR | 101400976 B1 | 5/2014 |
| KR | 20140110908 A | 9/2014 |

OTHER PUBLICATIONS

Aurelija Mockute et al. "Synthesis and Characterization of New MAX Phase Alloys". Linkoping University Institute of Technology. Linkoping Studies in Science and Technology Dissertation No. 1573. 2014. p. 1-79.
(Continued)

*Primary Examiner* — Daniel H Miller
(74) *Attorney, Agent, or Firm* — Harness, Dickey & Pierce, P.L.C.

(57) ABSTRACT

A method of manufacturing a MXene nanosheet includes removing an A atomic layer from an inorganic compound having a formula of $M_{n+1}AX_n$ to form a nanosheet, the nanosheet having a formula of $M_{n+1}X_nT_s$, and reducing the nanosheet having a formula of $M_{n+1}X_nT_s$ to form an MXene nanosheet, the MXene nanosheet having a formula of $M_{n+1}X_n$, wherein M is at least one of Group 3 transition metal, Group 4 transition metal, Group 5 transition metal, and Group 6 transition metal, A is at least one of a Group 12 element, Group 13 element, Group 14 element, Group 15 element and Group 16 element, X is one of carbon (C), nitrogen (N) and a combination thereof, $T_s$ is one of oxide (O), epoxide, hydroxide (OH), alkoxide having 1-5 carbon atoms, fluoride (F), chloride (Cl), bromide (Br), iodide (I), and a combination thereof, and n is one of 1, 2 and 3.

18 Claims, 27 Drawing Sheets

M₂AX
(211)

M₃AX₂
(312)

M₄AX₃
(413)

(51) Int. Cl.
  *C01B 21/06*  (2006.01)
  *B82Y 40/00*  (2011.01)
  *B82Y 30/00*  (2011.01)

(52) U.S. Cl.
  CPC ...... *C01P 2002/72* (2013.01); *C01P 2004/24* (2013.01); *C01P 2006/42* (2013.01); *Y10S 977/755* (2013.01); *Y10S 977/896* (2013.01); *Y10T 428/30* (2015.01)

(58) Field of Classification Search
  USPC ......................................................... 428/408
  See application file for complete search history.

(56) References Cited

OTHER PUBLICATIONS

Olha Mashtalir et al. "Intercalation and delamination of layered carbides and carbonitrides". Nature Communications. Macmillan Publishers Limited. 2013. p. 1-7.

Michael Naguib et al. " Two-Dimensional Nanocrystals Produced by Exfoliation of $Ti_3AlC_2$". Advanced Materals. Wiley-VCH Verlag GmbH & Co. KGaA, Weinheim. 2011. p. 4248-4253.

Michael Naguib et al. "Two-Dimensional Transition Metal Carbides". ACS Nano vol. 6 No. 2. American Chemical Society. 2012. p. 1322-1331.

Olha Mashtalir et al. "Intercalation and delamination of layered carbides and carbonitrides". Nature Communications. Macmillan Publishers Limited. 2013. p. 1-S16.

Maria R. Lukatskaya et al. "Cation Intercalation and High Volumetric Capacitance of Two-Dimensional Titanium Carbide". Science Mag vol. 341. Sep. 2013. p. 1502-1506.

MXENE NANOSHEET AND MANUFACTURING METHOD THEREOF

CROSS-REFERENCE TO RELATED APPLICATION

This application claims the benefit of Korean Patent Application No. 10-2015-0135766, filed on Sep. 24, 2015, in the Korean Intellectual Property Office, the disclosure of which is incorporated herein in its entirety by reference.

BACKGROUND

1. Field

Example embodiments relate to an MXene nanosheet and a manufacturing method thereof.

2. Description of the Related Art

Graphene is a single atomic layer of a honeycomb structure, which is composed of carbon atoms, and has received much attention worldwide due to its desirable physical properties. Recently, the explosive studies on graphene have sparked new interests towards graphene-analogous two-dimensional materials.

One of the two-dimensional materials, MAX phase (wherein M is a transition metal, A is an element of Group 13 or 14, and X is carbon and/or nitrogen) is a crystal composed of MX which has a semi-ceramic property and A which is a metal element different from M, and has desirable physical properties, e.g., electrical conductivity, oxidation-resistance, mechanical processability, etc. Until now, there have been over 60 synthetic MAX phases.

MAX phase is a two-dimensional material, but the transition metal carbide layers are stacked by relatively weak chemical bonding between A element and the transition metal M, unlike graphite or dichalcogenide. Therefore, modifying the two-dimensional structure using a general mechanical or chemical exfoliation method may be difficult.

In 2011, three-dimensional titanium-aluminum carbide was changed into a completely different two-dimensional structure by selectively removing aluminum layers using hydrofluoric acid. The research team called this two-dimensional material "MXene", which is obtained by exfoliation of the MAX phase. MXene has electrical conductivity and strength similar to those of graphene, and has a broad range of applications, ranging from energy storage devices to biomedical applications and composites.

However, because A layers are removed by exfoliating the MAX phase under relatively strong acid conditions, the exfoliated MXene is terminated with surface functional groups, e.g., O, OH or F, binding to the transition metal M, and such surface modification of the functional group is assumed to cause deterioration of intrinsic properties of MXene.

SUMMARY

Example embodiments provide a method of manufacturing an MXene nanosheet of which a surface is not substantially modified with functional groups.

Example embodiments also provide an MXene nanosheet manufactured by the manufacturing method.

According to example embodiments, a method of manufacturing an MXene nanosheet includes removing an A atomic layer from an inorganic compound having a formula of $M_{n+1}AX_n$ to form a nanosheet, the nanosheet having a formula of $M_{n+1}X_nT_s$, and reducing the nanosheet having a formula of $M_{n+1}X_nT_s$ to form an MXene nanosheet, the MXene nanosheet having a formula of $M_{n+1}X_n$, wherein M is at least one of Group 3 transition metal, Group 4 transition metal, Group 5 transition metal, and Group 6 transition metal, A is at least one of a Group 12 element, Group 13 element, Group 14 element, Group 15 element and Group 16 element, X is one of carbon (C), nitrogen (N), and a combination thereof, $T_s$ is one of oxide (O), hydroxide (OH), alkoxide having 1-5 carbon atoms, fluoride (F), chloride (Cl), bromide (Br), iodide (I), and a combination thereof, and n is one of 1, 2 and 3.

According to example embodiments, an MXene nanosheet includes a surface not modified by functional groups, the MXene nanosheet showing a peak attributed to unpaired electrons of 3d orbitals of a transition metal present on the surface upon electron paramagnetic resonance (EPR) spectroscopy.

A method of manufacturing an MXene nanosheet, according to example embodiments, may be used to provide an intrinsic MXene nanosheet, of which the surface is not modified with functional groups, e.g., O, OH, F, etc. The MXene nanosheet thus obtained is able to exhibit intrinsic properties of MXene.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
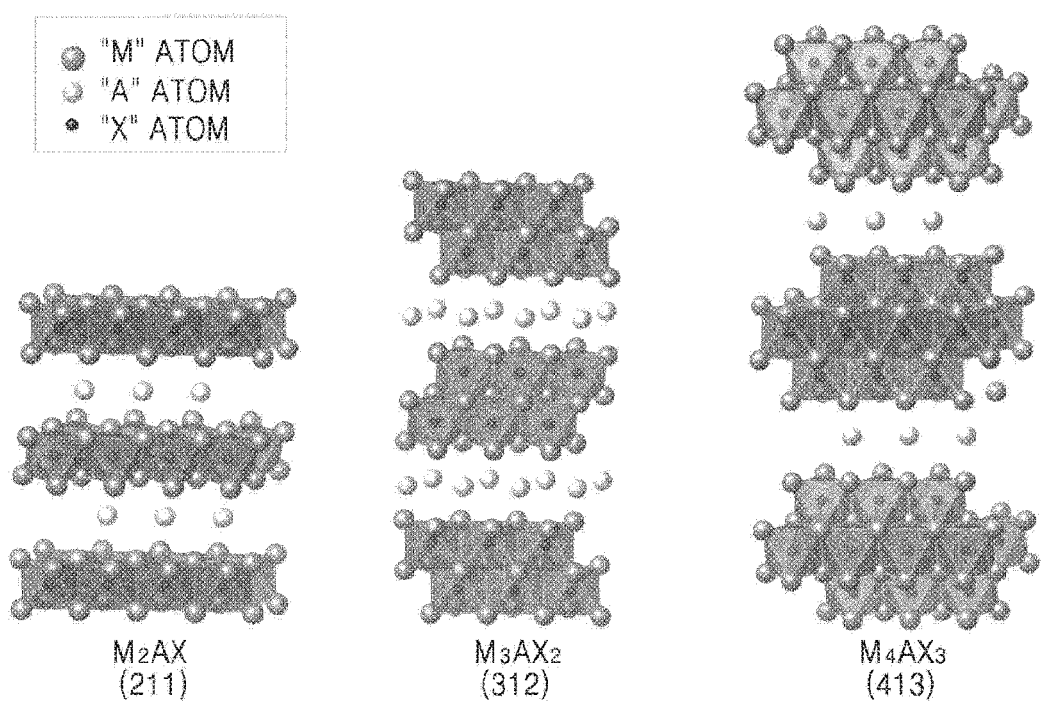
FIG. 1 shows crystal structures of MAX phases belonging to $M_2AX$ (211 class), $M_3AX_2$ (312 class) and $M_4AX_3$ (413 class)

Example embodiments of the present inventive concepts will hereinafter be described in detail, and may be more easily performed by those who have common knowledge in the related art. However, this disclosure may be embodied in many different forms and is not construed as limited to the example embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In the drawings, parts having no relationship with the description are omitted for clarity of the embodiments, and the same or similar constituent elements are indicated by the same reference numerals throughout the specification.

It will be understood that when an element is referred to as being "on," "connected" or "coupled" to another element, it can be directly on, connected or coupled to the other element or intervening elements may be present. In contrast, when an element is referred to as being "directly on," "directly connected" or "directly coupled" to another element, there are no intervening elements present. As used herein the term "and/or" includes any and all combinations of one or more of the associated listed items. Further, it will be understood that when a layer is referred to as being "under" another layer, it can be directly under or one or more intervening layers may also be present. In addition, it will also be understood that when a layer is referred to as being "between" two layers, it can be the only layer between the two layers, or one or more intervening layers may also be present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein. As used herein, expressions such as "at least one of," when preceding a list of elements, modify the entire list of elements and do not modify the individual elements of the list.

Hereinafter, an example MXene nanosheet and manufacturing method thereof will be described in more detail with reference to the accompanying drawings.

The method of manufacturing the MXene nanosheet, according to example embodiments, includes removing an A atomic layer from an inorganic compound having a formula of $M_{n+1}AX_n$ to form a nanosheet having a formula of $M_{n+1}X_nT_s$, and reducing the nanosheet having a formula of $M_{n+1}X_nT_s$ to form an MXene nanosheet having a formula of $M_{n+1}X_n$.

Herein, M is at least one transition metal selected from Group 3, Group 4, Group 5, and Group 6 on the periodic table of the elements, A is at least one selected from Group 12, Group 13, Group 14, Group 15 and Group 16 on the periodic table of the elements, X is carbon (C), nitrogen (N), or a combination thereof, $T_s$ is oxide (O), epoxide, hydroxide (OH), alkoxide having 1-5 carbon atoms, fluoride (F), chloride (Cl), bromide (Br), iodide (I), or a combination thereof, and n is 1, 2 or 3.

M may be, for example, at least one transition metal selected from scandium (Sc), yttrium (Y), lutetium (Lu), titanium (Ti), zirconium (Zr), hafnium (Hf), vanadium (V), niobium (Nb), tantalum (Ta), chromium (Cr), molybdenum (Mo) and tungsten (W). For example, M may be at least one transition metal selected from Sc, Ti, V, Cr, Zr, Nb, Mo, Hf and Ta.

A may be, for example, at least one selected from aluminum (Al), silicon (Si), phosphorus (P), sulfur (S), gallium (Ga), germanium (Ge), arsenic (As), cadmium (Cd), indium (In), tin (Sn), thallium (Tl) and lead (Pb).

The inorganic compound having a formula of $M_{n+1}AX_n$ is a layered hexagonal carbide, nitride, or carbonitride called "MAX phase". The MAX phase has a structure including alternating arrays of a carbide and/or nitride layer (layer having a formula of $M_{n+1}X_n$, hereinafter, referred to as "MXene layer") and an A atomic layer, the carbide and/or nitride layer being formed by a two-dimensional array of unit cells, in which each X is positioned within an octahedral array of six transition metals (M). The MXene layer and the A atomic layer are stacked by ionic metallic bonding.

The MAX phases may be divided into three classes depending on their N-value. $M_2AX$ with n=1 belongs to "211" class, $M_3AX_2$ with n=2 belongs to "312" class, and $M_4AX_3$ with n=3 belongs to "413" class. Crystal structures of MAX phases belonging to 211, 312 and 413 classes are illustrated in FIG. 1.

The inorganic compound of MAX phase having a formula of $M_{n+1}AX_n$ may be, but is not limited to, exemplified as follows.

(211) $Ti_2CdC$, $Sc_2InC$, $Ti_2AlC$, $Ti_2GaC$, $Ti_2InC$, $Ti_2TlC$, $V_2AlC$, $V_2GaC$, $Cr_2GaC$, $Ti_2AlN$, $Ti_2GaN$, $Ti_2InN$, $V_2GaN$, $Cr_2GaN$, $Ti_2GeC$, $Ti_2SnC$, $Ti_2PbC$, $V_2GeC$, $Cr_2AlC$, $Cr_2GeC$, $V_2PC$, $V_2AsC$, $Ti_2SC$, $Zr_2InC$, $Zr_2TlC$, $Nb_2AlC$, $Nb_2GaC$, $Nb_2InC$, $Mo_2GaC$, $Zr_2InN$, $Zr_2TlN$, $Zr_2SnC$, $Zr_2PbC$, $Nb_2SnC$, $Nb_2PC$, $Nb_2AsC$, $Zr_2SC$, $Nb_2SC$, $Hf_2InC$, $Hf_2TlC$, $Ta_2AlC$, $Ta_2GaC$, $Hf_2SnC$, $Hf_2PbC$, $Hf_2SnN$, $Hf_2SC$;

(312) $Ti_3AlC_2$, $V_3AlC_2$, $Ti_3SiC_2$, $Ti_3GeC_2$, $Ti_3SnC_2$, $Ta_3AlC_2$; and (413) $Ti_4AlN_3$, $V_4AlC_3$, $Ti_4GaC_3$, $Ti_4SiC_3$, $Ti_4GeC_3$, $Nb_4AlC_3$, $Ta_4AlC_3$.

The method of manufacturing the MXene nanosheet, according to example embodiments, is used to manufacture an MXene nanosheet, of which a surface is not substantially modified with functional groups, by selectively removing the A atomic layer from the MAX phase and then performing a reduction treatment. For example, the manufactured MXene nanosheet may have relatively few functional groups or no functional groups on its surface.

Figure 2:
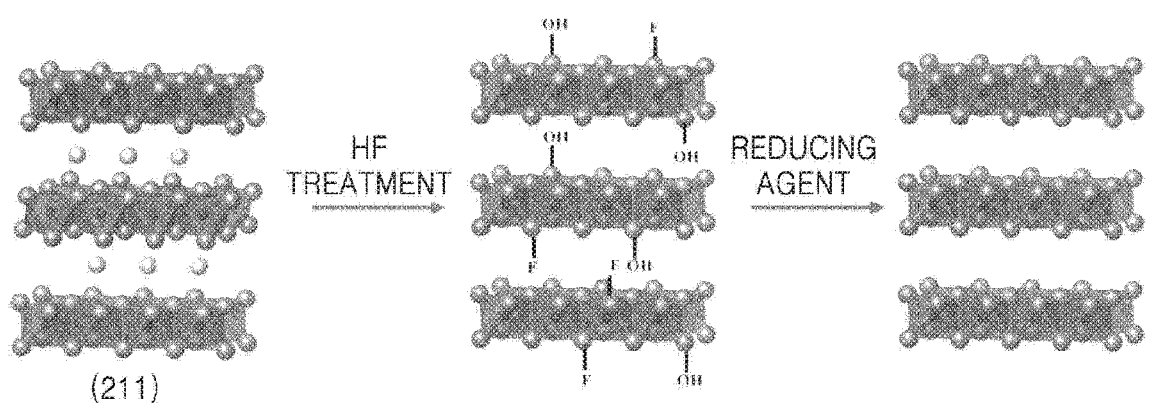
FIG. 2 is a schematic illustration showing a process of manufacturing an MXene nanosheet having a formula of $M_2X$ from MAX phase having a formula of $M_2AX$ (211) according to example embodiments.
Figure 3:
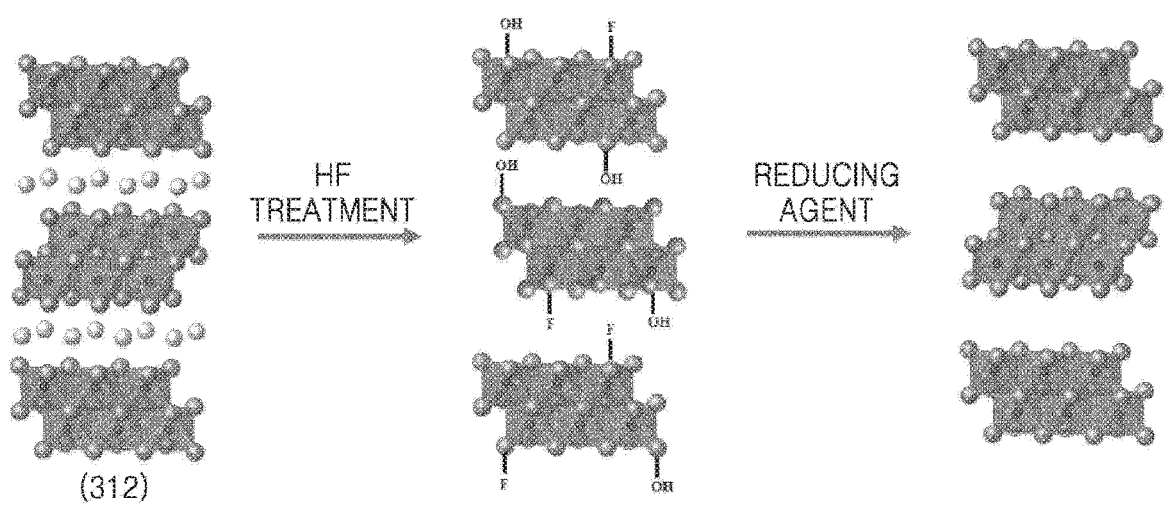
FIG. 3 is a schematic illustration showing a process of manufacturing an MXene nanosheet having a formula of $M_3X_2$ from MAX phase having a formula of $M_3AX_2$ (312) according to example embodiments.
Figure 4:
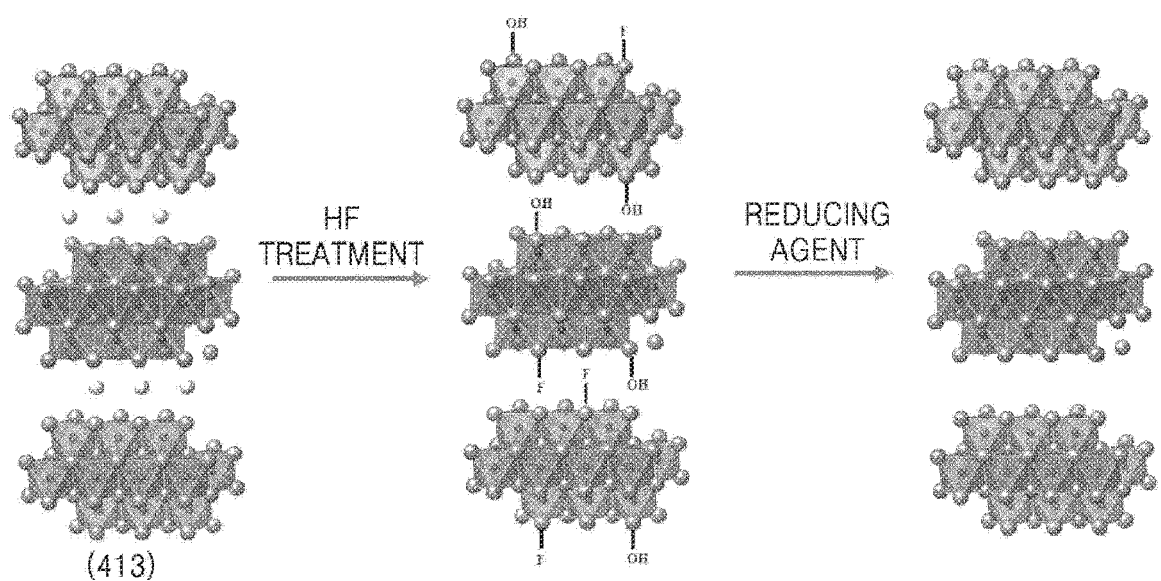
FIG. 4 is a schematic illustration showing a process of manufacturing an MXene nanosheet having a formula of $M_4X_3$ from MAX phase having a formula of $M_4AX_3$ (413) according to example embodiments.

FIGS. 2 through 4 show schematic illustrations of the process of manufacturing MXene nanosheets, each having a formula of $M_2X$, $M_3X_2$ or $M_4X_3$ by selectively removing an A atomic layer from the MAX phase having a formula of $M_2AX$ (211), $M_3AX_2$ (312) or $M_4AX_3$ (413) and then performing a reduction treatment according to example embodiments.

According to example embodiments, the A atomic layer is first selectively removed from the MAX phase to obtain a nanosheet having a formula of $M_{n+1}X_nT_s$.

The nanosheet having a formula of $M_{n+1}X_nT_s$ means that the surface of the MXene layer is modified with the functional group $T_s$. Herein, $T_s$ is a functional group binding to the surface of the MXene layer, and may include, for example, oxide (O), epoxide, hydroxide (OH), alkoxide having 1-5 carbon atoms, fluoride (F), chloride (Cl), bromide (Br), iodide (I), or a combination thereof. M, X and n are the same as described above.

The formula $M_{n+1}X_nT_s$ may be, for example, $M_{n+1}X_n(OH)_xO_yF_z$ (wherein x, y or z represents a molar ratio of each functional group present on the surface per 1 mole of $M_{n+1}X_n$).

The nanosheet having a formula of $M_{n+1}X_nT_s$ may be surface-terminated with $T_s$ functional groups by substantially binding the $T_s$ functional groups to most transition metals M on the surface of the MXene layer.

Removing the A atomic layer may be performed under acidic conditions. For example, removing the A atomic layer may be performed by treating the inorganic compound having a formula of $M_{n+1}AX_n$ with a strong acid capable of reacting with the A atom to remove the A atomic layer therefrom by etching.

The acid capable of etching the A atomic layer may be an organic or inorganic acid. The acid may be in a gas phase or a liquid phase, as long as it is able to remove the A atomic layer from MAX phase.

The acid may be, for example, a relatively strong acid containing a fluorine atom. An example thereof may be hydrofluoric acid (HF). Another example may be an alkali metal bifluoride salt, e.g., $LiHF_2$, $NaHF_2$, or $KHF_2$. Still another example may be a fluorine-containing compound capable of producing hydrofluoric acid in the presence of an acid. This fluorine-containing compound may be, for example, lithium fluoride (LiF), sodium fluoride (NaF), magnesium fluoride ($MgF_2$), strontium fluoride ($SrF_2$), beryllium fluoride ($BeF_2$), calcium fluoride ($CaF_2$), ammonium fluoride ($NH_4F$), ammonium difluoride ($NH_4HF_2$), ammonium hexafluoroaluminate (($NH_4)_3AlF_6$), or a combination thereof. These fluorine-containing compounds may be mixed with a strong acid, e.g., hydrochloric acid, sulfuric acid, nitric acid, or a combination thereof, thereby being used as an etching solution capable of removing the A atomic layer.

Removing the A atomic layer from the MAX phase may be performed at a temperature ranging from about 20° C. to about 800° C., for example, at a temperature of about 20° C. to about 100° C., about 20° C. to about 80° C., about 20° C. to about 60° C., or about 30° C. to about 60° C., for example, at room temperature.

A nanosheet having a formula of $M_{n+1}X_nT_s$ may be obtained by removing the A atomic layer from the MAX phase under relatively strong acid conditions and then additionally performing filtration and drying processes.

The nanosheet having a formula of $M_{n+1}X_nT_s$, obtained after removing the A atomic layer, may still maintain the two-dimensional layered structure.

Subsequently, the MXene nanosheet having a formula of $M_{n+1}X_n$ is obtained by reducing the nanosheet having a formula of $M_{n+1}X_nT_s$.

The reduction process may be performed using a chemical, thermal, or thermo-chemical reduction process.

The chemical reduction process includes various methods, e.g., fuming, dipping, in-situ, etc., depending on a reducing agent.

Examples of the reducing agent may be a combination of alkali metal and amine or ammonia ($NH_3$). The alkali metal may be, for example, at least one selected from Li, Na and K. The amine may be, for example, ethylene diamine, methyl amine, diisopropylamine, etc.

When a combination of alkali metal and amine or ammonia is used, the reduction may be performed below a boiling point of amine or ammonia in order to form a complex thereof. For example, the nanosheet having a formula of $M_{n+1}X_nT_s$, from which water is removed, is placed in a cooling reactor, together with the alkali metal, and ethylene diamine or ammonia is injected under a nitrogen atmosphere, and a reduction reaction is allowed at a temperature ranging from about −80° C. to about −30° C., for example, at about −70° C. to about −40° C., or at about −60° C. to about −50° C. for about 1 hour to 100 hours.

Another example of the reducing agent may be an environmental friendly reducing agent, e.g., ascorbic acid, glucose, etc.

In addition, the reduction reaction may be performed by inducing deoxidation in an alkaline aqueous solution, distilled water, or an organic solvent, e.g., dimethylformamide (DMF), dimethylacetamide, n-methyl pyrrolidone (NMP), etc., by general heating or by using microwaves for a short time of about 1~30 minutes.

The thermal reduction process may be performed under an inert gas or reducing gas atmosphere, for example, by heat treatment at a temperature of 100° C. or higher to reduce the nanosheet having a formula of $M_{n+1}X_nT_s$. For example, the thermal reduction process may be selectively performed at a temperature ranging from 100° C. to 1,900° C. For example, a heat treatment is possible, for example, at 150° C. or higher. Upon the thermal reduction process, a heat treatment may be performed by controlling a heating rate, because an undesirably fast heating rate deteriorates the two-dimensional shape of the resulting MXene nanosheet. When thermal reduction is performed, a heat treatment may be performed, for example, by increasing the temperature to 150° C. at a rate of 0.15 to 0.5° C./min, and thereafter, increasing the temperature at a rate of 0.5 to 10° C./min.

In the thermo-chemical reduction process, a combination of the above-described chemical reduction and thermal reduction is used.

The MXene nanosheet having a formula of $M_{n+1}X_n$, which is obtained through the reduction process, may be further subjected to neutralization using an acid, in order to neutralize the reducing agent, which may exist between the layers.

The MXene nanosheet having a formula of $M_{n+1}X_n$, which is obtained after reduction, may be washed and dried.

The drying may be performed, for example, at a temperature ranging from about 100° C. to about 200° C. under vacuum. Further, because compounds used as reducing agents may be intercalated between the MXene nanosheet layers, the MXene may be dried in a vacuum oven at about 100° C. or higher, together with an alcohol solvent, e.g., ethanol, for removal of impurities and deintercalation of the intercalated reducing agents.

The MXene nanosheet having a formula of $M_{n+1}X_n$, thus obtained may have the following composition.

$Sc_2C$, $Ti_2C$, $V_2C$, $Cr_2C$, $Zr_2C$, $Nb_2C$, $Mo_2C$, $Hf_2C$, $Ta_2C$;
$Sc_3C_2$, $Ti_3C_2$, $V_3C_2$, $Cr_3C_2$, $Zr_3C_2$, $Nb_3C_2$, $Mo_3C_2$, $Hf_3C_2$, $Ta_3C_2$; and
$Sc_4N_3$, $Ti_4N_3$, $V_4N_3$, $Cr_4N_3$, $Zr_4N_3$, $Nb_4N_3$, $Mo_4N_3$, $Hf_4N_3$, $Ta_4N_3$.

The MXene nanosheet has a two-dimensional planar structure.

The MXene nanosheet may include a single crystal layer formed by exfoliation of crystal layers having the formula of $M_{n+1}X_n$, or a plurality of layers formed by stacking of the single crystal layers in a MAX phase. In the MXene nanosheet including a plurality of crystal layers, the layers may bind to each other by van der Waals force.

The MXene nanosheet may have a thickness from a single layer thickness to about 100 nm.

The MXene nanosheet may be obtained in flakes.

The MXene nanosheet may have a width of about 100 $nm^2$ to about 0.01 $cm^2$.

The MXene nanosheet manufactured by the above manufacturing method may exhibit intrinsic properties of MXene having no functional groups on the surface, and may easily form a hybrid, together with different nanomaterials, e.g., graphene or hexagonal boron nitride (h-BN). Therefore, it is expected that the MXene nanosheet is applied to a variety of electronic devices and energy storage devices, and contributes to improvement of their performances.

Because the functional groups, e.g., —OH, are removed from the surface of the MXene nanosheet manufactured by the above manufacturing method, unpaired electrons exist in the 3d orbitals of transition metal M on the surface of the MXene nanosheet. Changes in the electron configuration of transition metal M on the surface may be examined by electron paramagnetic resonance (EPR) spectroscopy before and after treatment of the reducing agent. According to EPR spectroscopy, the MXene nanosheet obtained after a reduction treatment shows EPR peaks in particular magnetic fields depending on the transition metal M, and these peaks are attributed to intrinsic properties of unpaired electrons of the 3d orbitals of the transition metal M.

Reference will now be made in detail to example embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, for purposes of explanation. As used herein, the term "and/or" includes any and all combinations of one or more of the associated listed items. Expressions such as "at least one of", when preceding a list of elements, modify the entire list of elements and do not modify the individual elements of the list.

Hereinafter, the present inventive concepts will be described in more detail with reference to the following Examples and Comparative Examples. However, Examples described herein should be considered in a descriptive sense only and not for purposes of limitation.

Preparation Example 1

Synthesis of $Ti_3AlC_2$ $Ti_2AlC$ (MAXTHAL®-211, purchased from Kanthal) and TiC (purchased from Alfa asear) are mixed at a molar ratio of 1:1, followed by ball milling for 24 hours. The milled mixture of $Ti_2AlC$ and TiC was sintered by spark plasma sintering (SPS) at 1250° C. for 10 minutes to synthesize $Ti_3AlC_2$. $Ti_3AlC_2$ thus synthesized is subjected to sonication in methanol to prepare powder.

Example 1

Preparation of $Ti_2C$ from $Ti_2AlC$ 1 g of $Ti_2AlC$ (MAXTHAL®-211, purchased from Kanthal) is mixed with 10 mL of 10% HF, and stirred at room temperature for 10 hours. The resulting product ($Ti_2CT_s$) from stirring is filtered with 1 L of water, and centrifugation is performed in order to remove impurities. Substances floating on water are collected and dried in a vacuum oven for 24 hours.

100 mg of the resulting product ($Ti_2CT_s$) is put in a flask and water is removed. 70 mg of Li metal is added thereto. 10 mL of ethylene diamine (EDA) is added under a nitrogen atmosphere, and a reaction is allowed at 25° C., 50° C. and 80° C. from room temperature to 80° C., respectively. Each of the reaction products thus obtained is neutralized with 500 mL of 5 wt % HCl, and filtered while successively washing with 1 L of water, 500 mL of ethanol, and 300 mL of acetone. After washing, the powder is dried in a vacuum oven at 120° C. for 2 days to obtain $Ti_2C$.

Example 2

Preparation of $Ti_3C_2$ from $Ti_3AlC_2$ $Ti_3C_2$ is obtained in the same manner as in Example 1, except that $Ti_3AlC_2$ synthesized in Preparation Example 1 is used as a starting material instead of $Ti_2AlC$, 1 g of $Ti_3AlC_2$ is mixed with 10 mL of 50% HF, and this mixture is stirred at room temperature for 2 hours.

Evaluation Example 1

Figure 5:
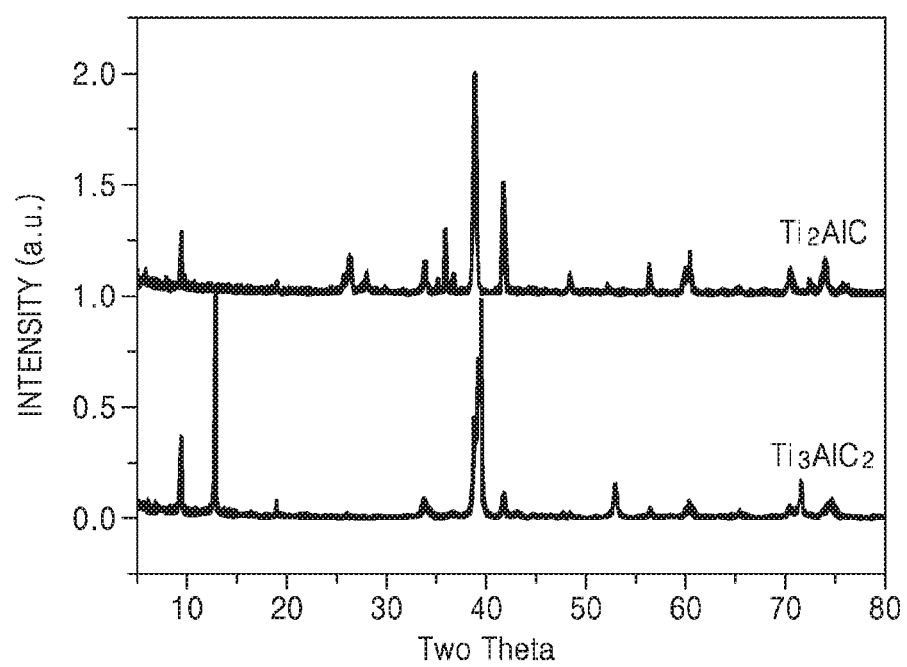
FIG. 5 shows the result of X-ray diffraction (XRD) analysis of $Ti_2AlC$ used as a starting material in Preparation Example 1 and $Ti_3AlC_2$ synthesized therefrom.

X-ray Diffraction (XRD) Analysis $Ti_2AlC$ (MAXTHAL®-211, purchased from Kanthal) and $Ti_3AlC_2$ synthesized in Preparation Example 1 are subjected to XRD analysis, and the result is shown in FIG. 5. XRD is performed using a Cu-Kα ray.

As shown in FIG. 5, both $Ti_2AlC$ and synthetic $Ti_3AlC_2$ are found to have a MAX phase crystal structure.

Figure 6:
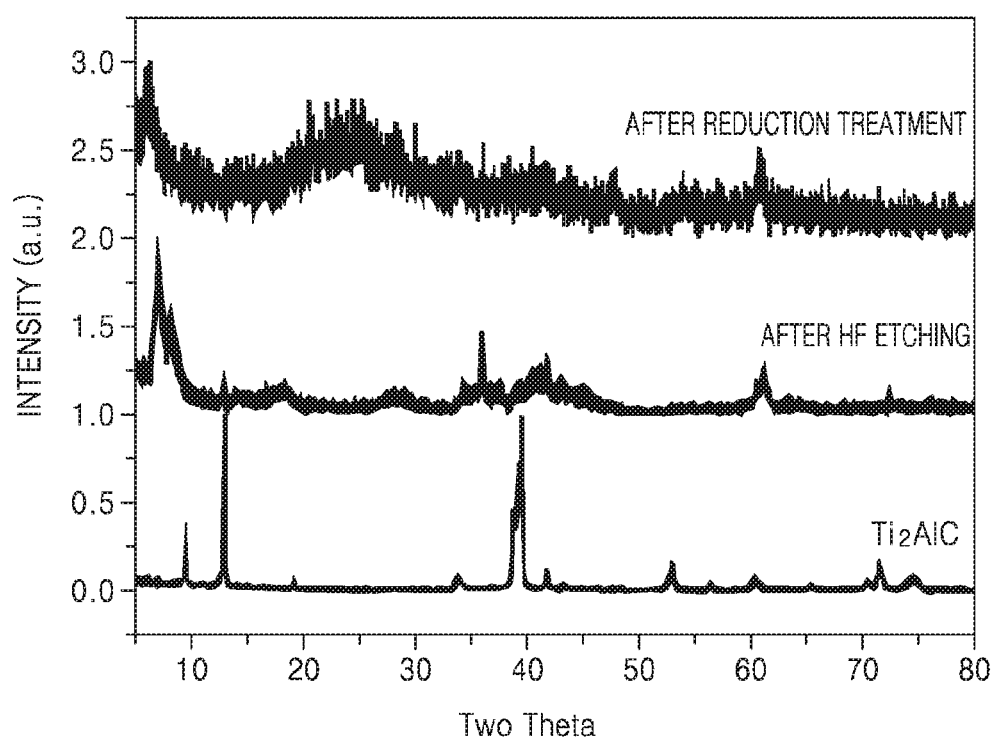
FIG. 6 shows the result of XRD analysis of $Ti_2AlC$ used as a starting material in Example 1, an intermediate product after HF etching, and a final product $Ti_2C$ after a reduction treatment.

$Ti_2AlC$ used as the starting material in Example 1, an intermediate product after HF etching, and a final product $Ti_2C$ after a reduction treatment are subjected to XRD analysis, and the result is shown in FIG. 6.

Figure 7:
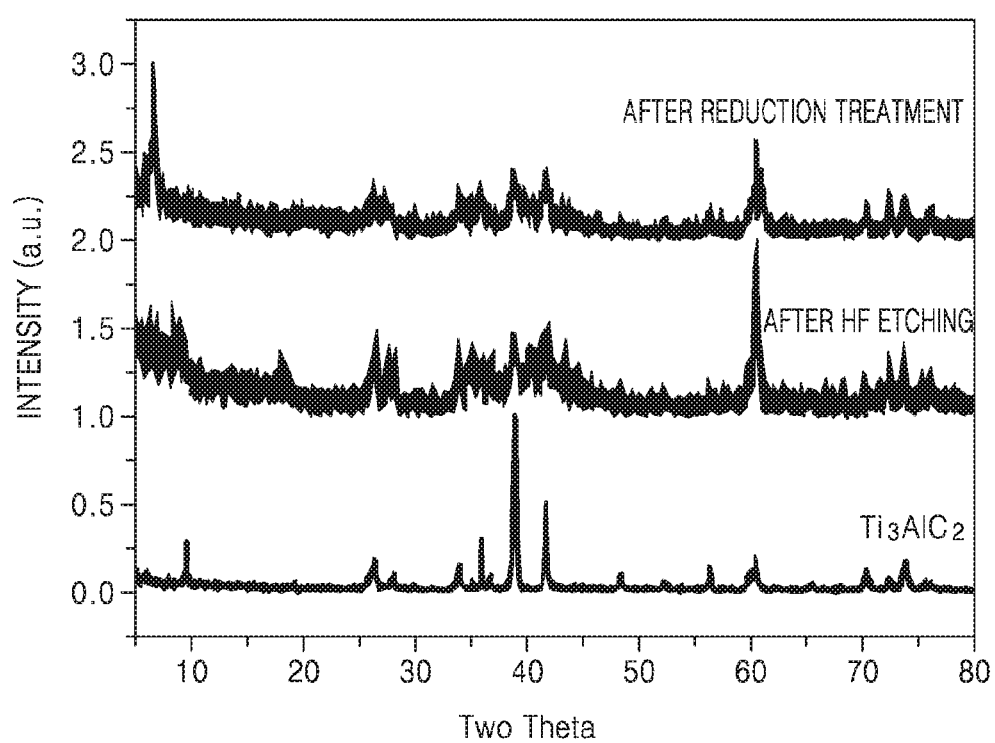
FIG. 7 shows the result of XRD analysis of $Ti_3AlC_2$ used as a starting material in Example 2, an intermediate product after HF etching, and a final product $Ti_3C_2$ after a reduction treatment.

In addition, $Ti_3AlC_2$ used as the starting material in Example 2, an intermediate product after HF etching, and a final product $Ti_3C_2$ after a reduction treatment are subjected to XRD analysis, and the result is shown in FIG. 7.

As shown in FIGS. 6 and 7, $Ti_2AlC$ and $Ti_3AlC_2$ show [002] diffraction peaks lower than 10°, indicating that they maintain a two-dimensional layered structure even after HF etching and reduction treatment with LiEDA.

Evaluation Example 2

Figure 8A:
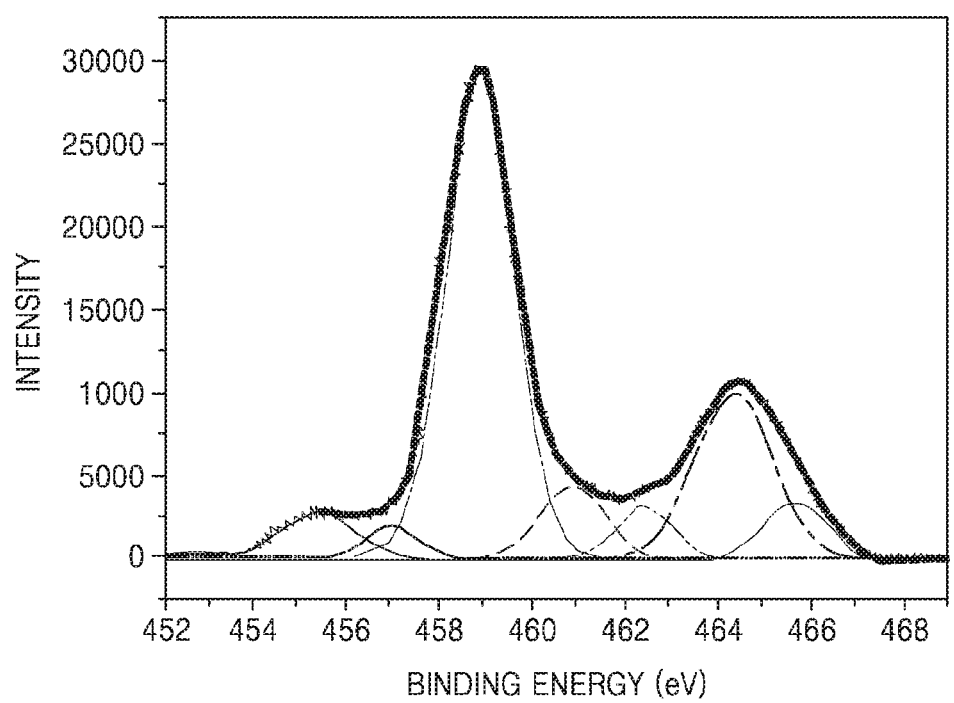
FIGS. 8a through 8c show results of X-ray photoelectron spectroscopy (XPS) analysis of $Ti_2AlC$ used as a starting material in Example 1, an intermediate product after HF etching, and a final product $Ti_2C$ after a reduction treatment while increasing an incident beam angle, respectively.
Figure 8B:
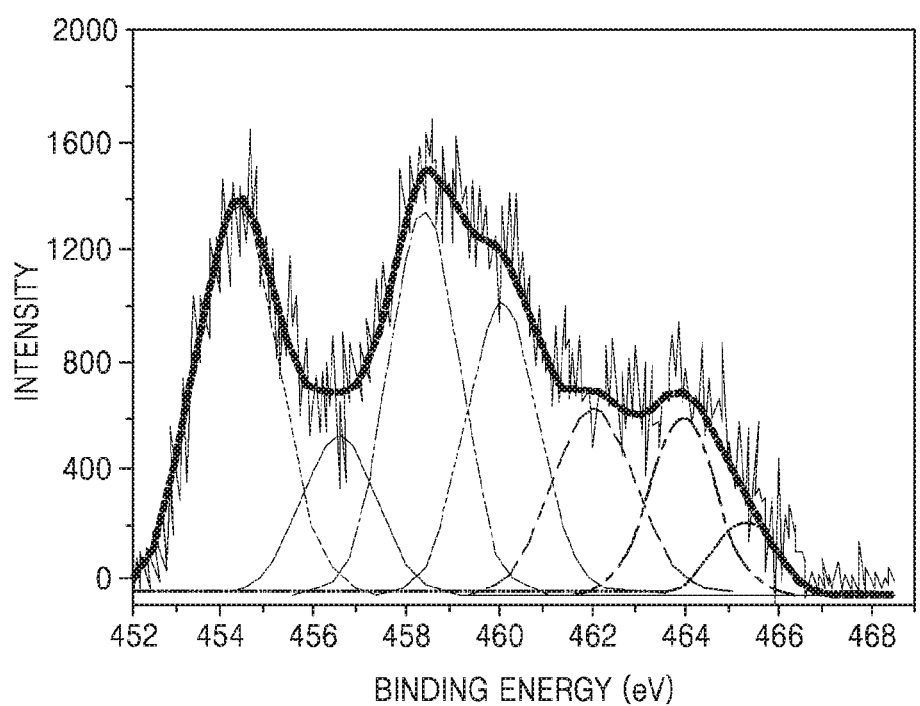
Figure 8C:
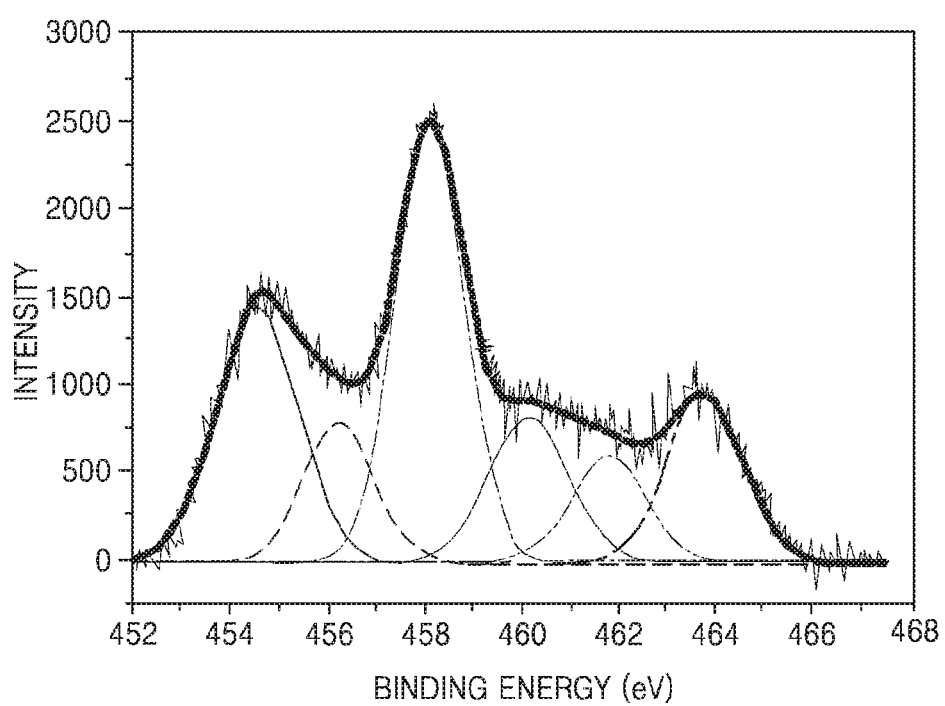

X-ray Photoelectron Spectroscopy (XPS) Analysis $Ti_2AlC$ used as the starting material in Example 1, an intermediate product after HF etching, and a final product $Ti_2C$ after a reduction treatment are subjected to XPS analysis while increasing an incident beam angle, and results are shown in FIGS. 8a to 8c, respectively.

Figure 9A:
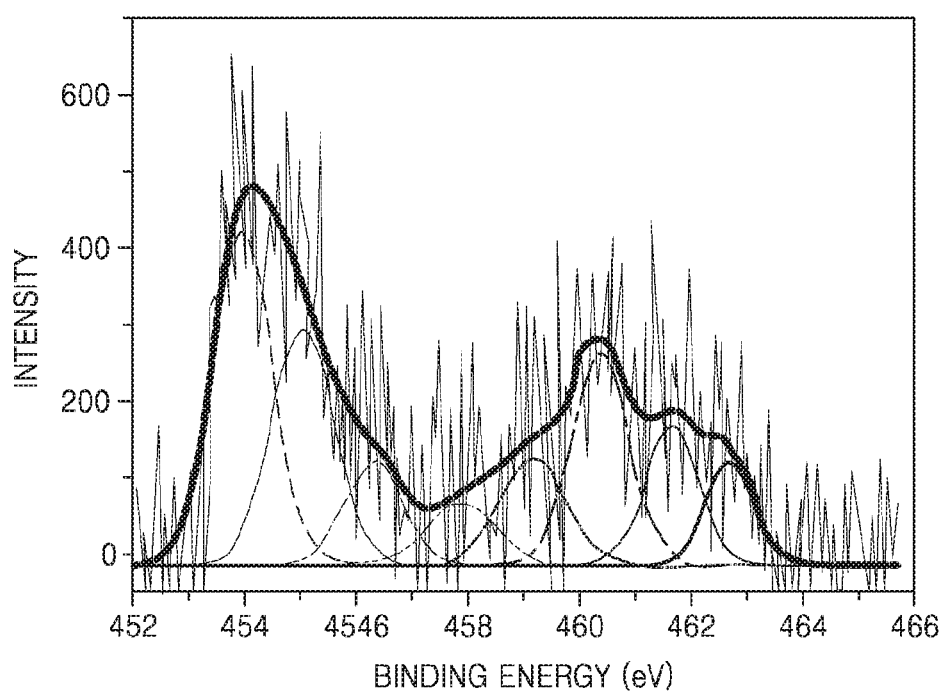
FIGS. 9a through 9c show results of XPS analysis of $Ti_3AlC_2$ used as a starting material in Example 2, an intermediate product after HF etching, and a final product $Ti_3C_2$ after a reduction treatment, respectively.
Figure 9B:
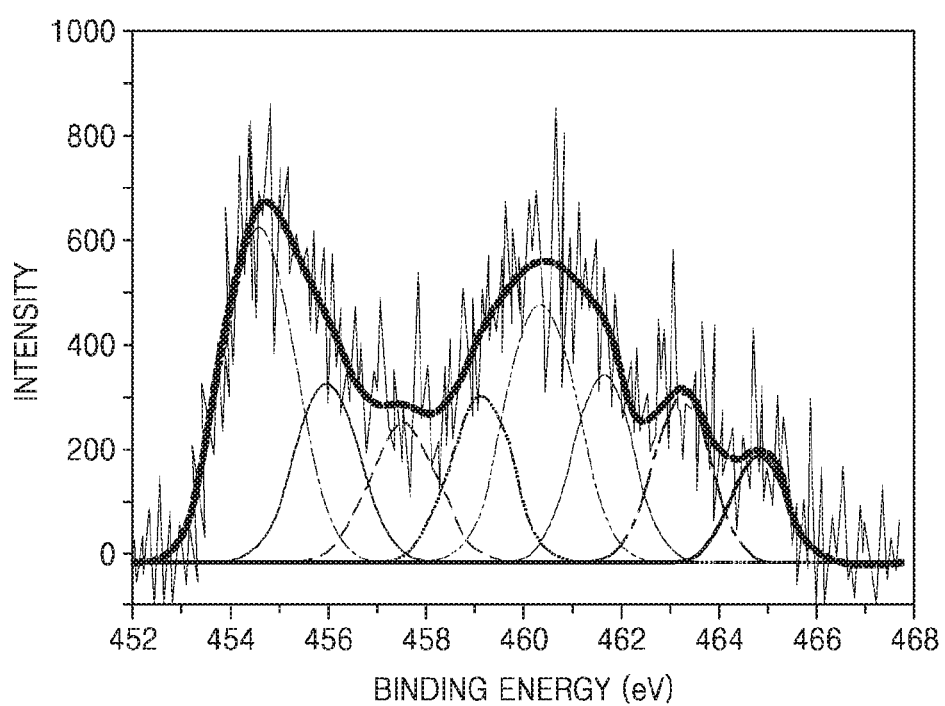
Figure 9C:
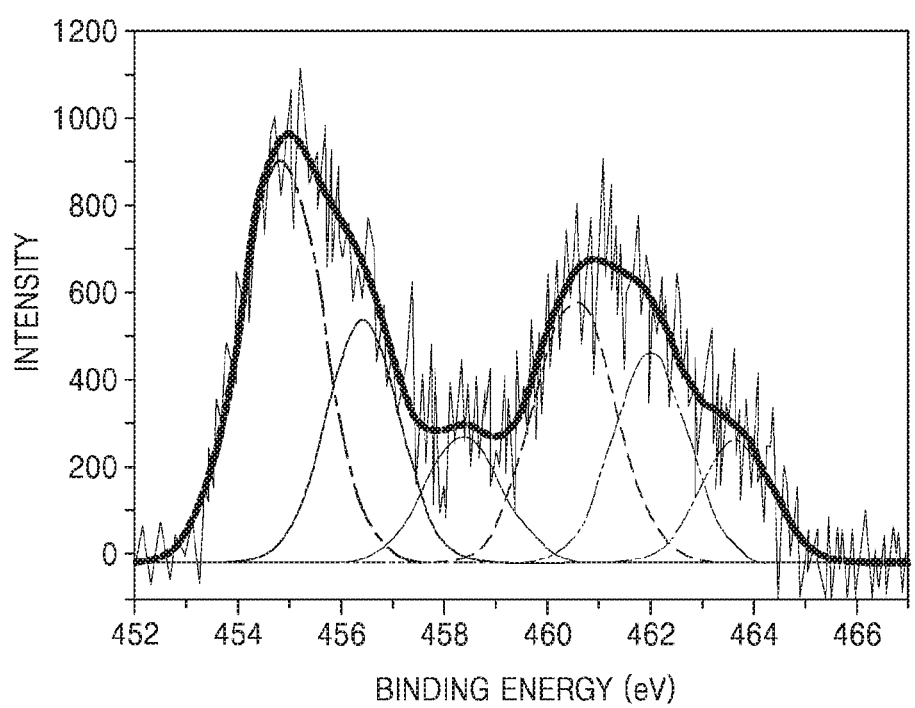

In addition, $Ti_3AlC_2$ used as the starting material in Example 2, an intermediate product after HF etching, and a final product $Ti_3C_2$ after a reduction treatment are subjected to XRD analysis, and results are shown in FIGS. 9a to 9c, respectively.

As shown in FIGS. 8a to 8c and FIGS. 9a to 9c, the intensity of the peaks at 458 eV and 464 eV is increased after HF treatment, indicating Ti—O peaks due to oxidation of the surface of Ti transition metal. Reduction in the peak intensity after treatment of the reducing agent (LiEDA) suggests removal of oxygen functional groups from the surface of Ti transition metal.

Evaluation Example 3

Field Emission Electron Probe Microanalysis (FESEM)

Figure 10A:
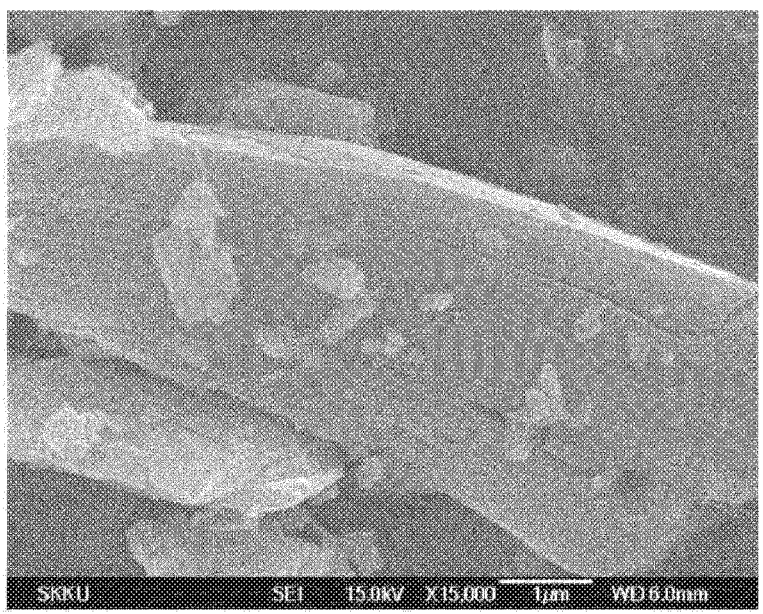
FIGS. 10a through 10c show results of an electron probe micro analyzer (FESEM) of $Ti_2AlC$ used as a starting material in Example 1, an intermediate product after HF etching, and a final product $Ti_2C$ after a reduction treatment, respectively.
Figure 10B:
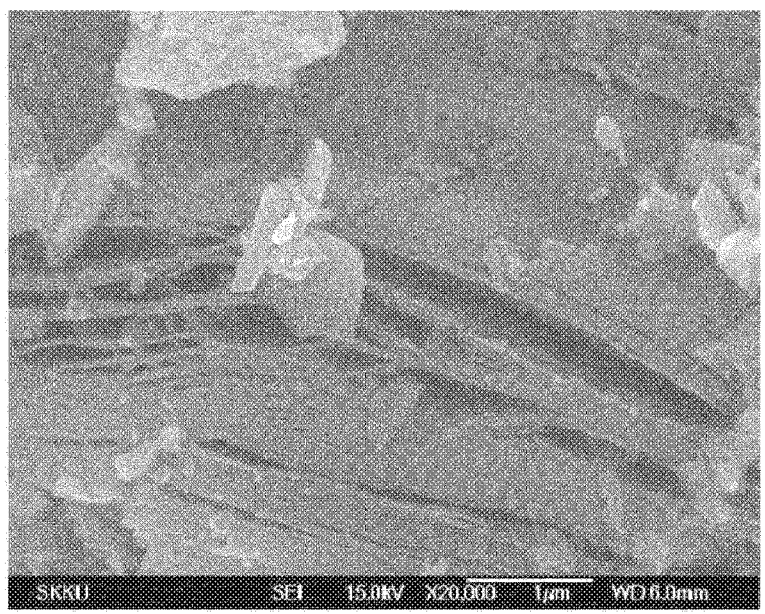
Figure 10C:
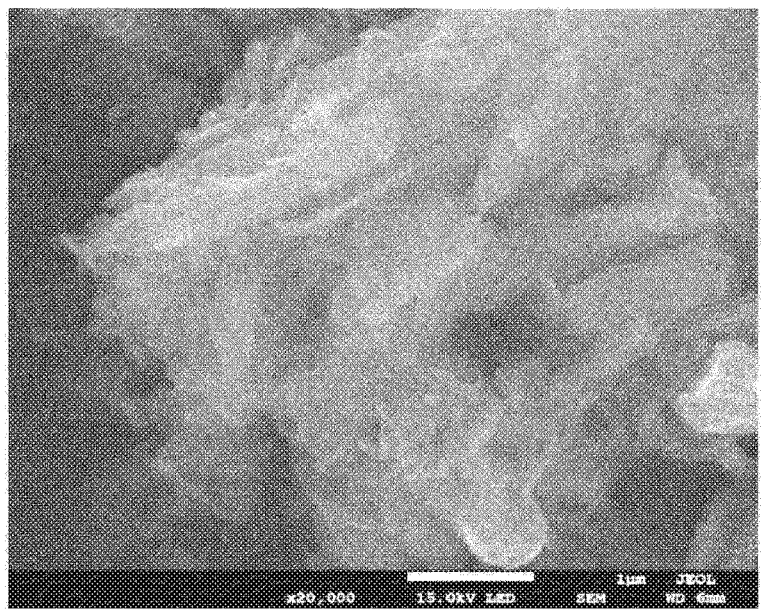

$Ti_2AlC$ used as the starting material in Example 1, an intermediate product after HF etching, and a final product $Ti_2C$ after a reduction treatment are subjected to FESEM, and observed images are shown in FIGS. 10a to 10c, respectively.

Figure 11A:
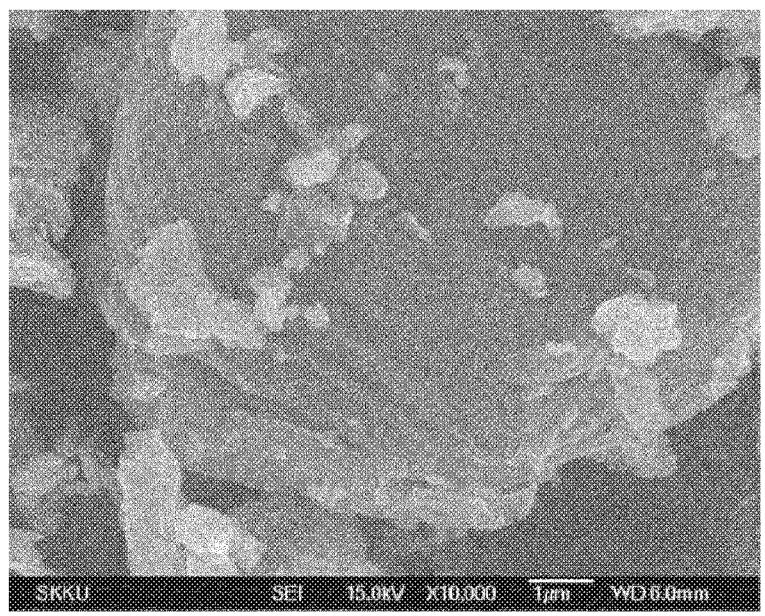
FIGS. 11a through 11c show results of FESEM analysis of $Ti_3AlC_2$ used as a starting material in Example 2, an intermediate product after HF etching, and a final product $Ti_3C_2$ after a reduction treatment, respectively.
Figure 11B:
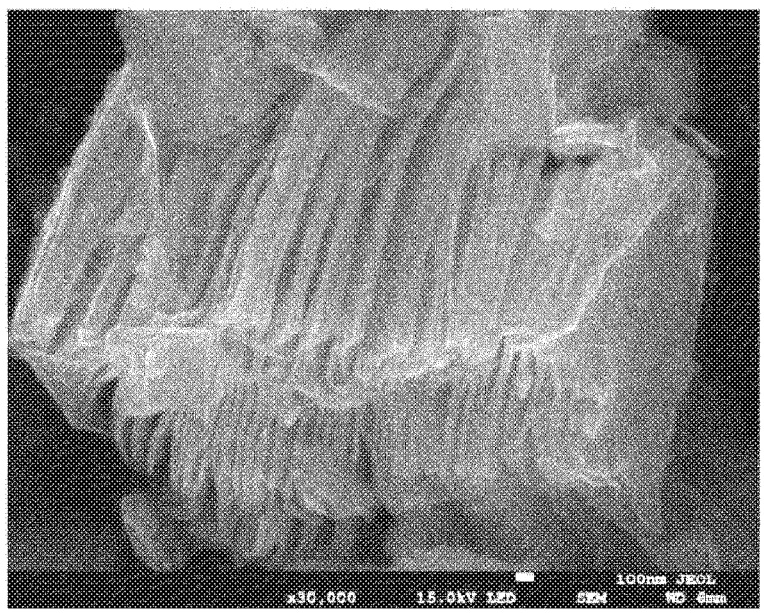
Figure 11C:
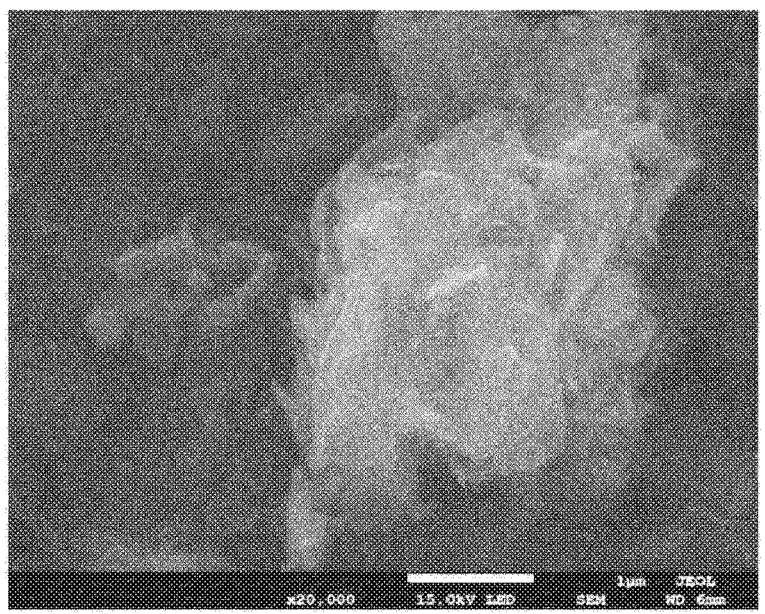

In addition, $Ti_3AlC_2$ used as the starting material in Example 2, an intermediate product after HF etching, and a final product $Ti_3C_2$ after a reduction treatment are subjected to FESEM analysis, and observed images are shown in FIGS. 11a to 11c, respectively.

As shown in FIGS. 10a to 10c and FIGS. 11a to 11c, $Ti_2AlC$ and $Ti_3AlC_2$ are exfoliated to $Ti_2CT_s$ and $Ti_3C_2T_s$ nanosheets having a two-dimensional layered structure after HF etching, and then completely exfoliated to a MXene nanosheet while maintaining the two-dimensional layered structure after a reduction treatment with LiEDA.

Evaluation Example 4

Figure 12A:
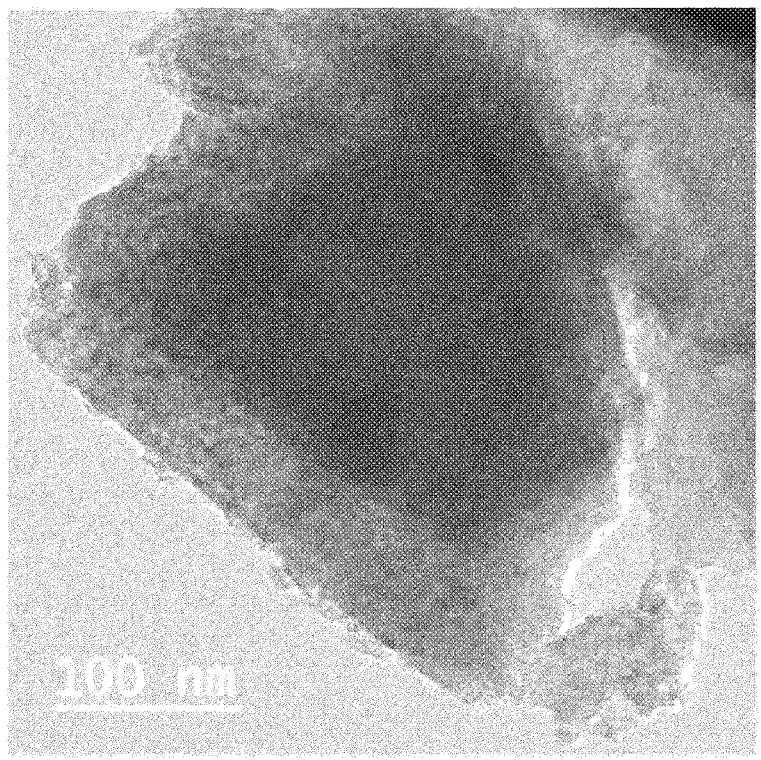
FIGS. 12a through 12c show results of transmission electron microscopy (TEM) of $Ti_2AlC$ used as a starting material in Example 1, an intermediate product after HF etching, and a final product $Ti_2C$ after a reduction treatment, respectively.
Figure 12B:
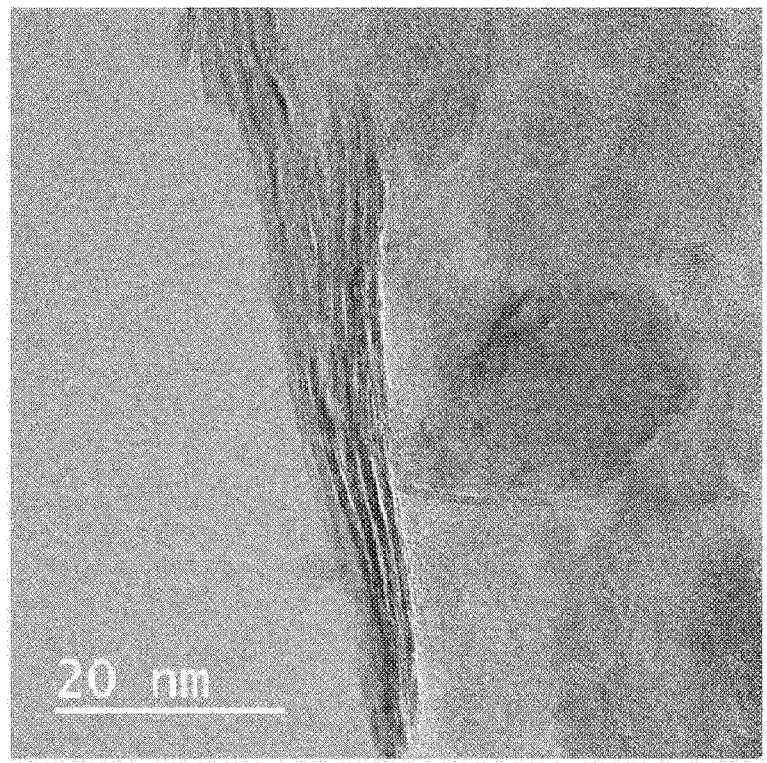
Figure 12C:
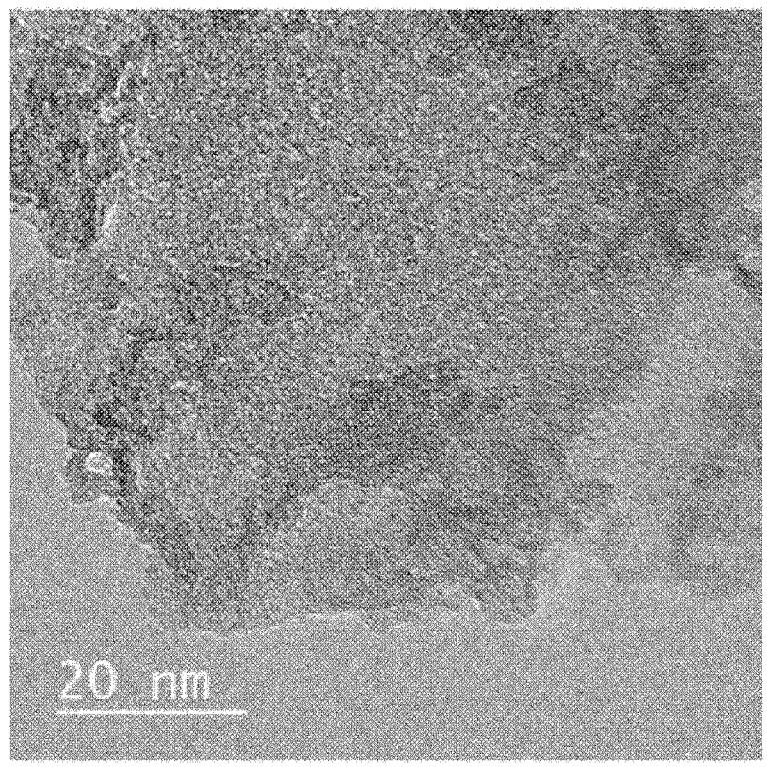

Transmission Electron Microscopy (TEM) Analysis $Ti_2AlC$ used as the starting material in Example 1, an intermediate product after HF etching, and a final product $Ti_2C$ after a reduction treatment are subjected to TEM analysis, and observed images are shown in FIGS. 12a to 12c, respectively.

Figure 13A:
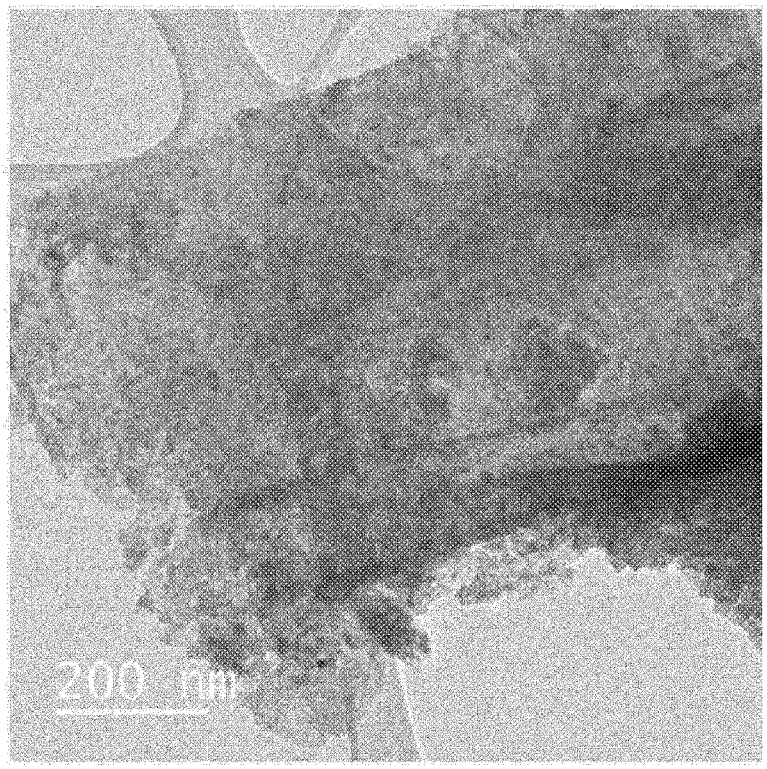
FIGS. 13a through 13c show results of TEM analysis of $Ti_3AlC_2$ used as a starting material in Example 2, an intermediate product after HF etching, and a final product $Ti_3C_2$ after a reduction treatment, respectively.
Figure 13B:
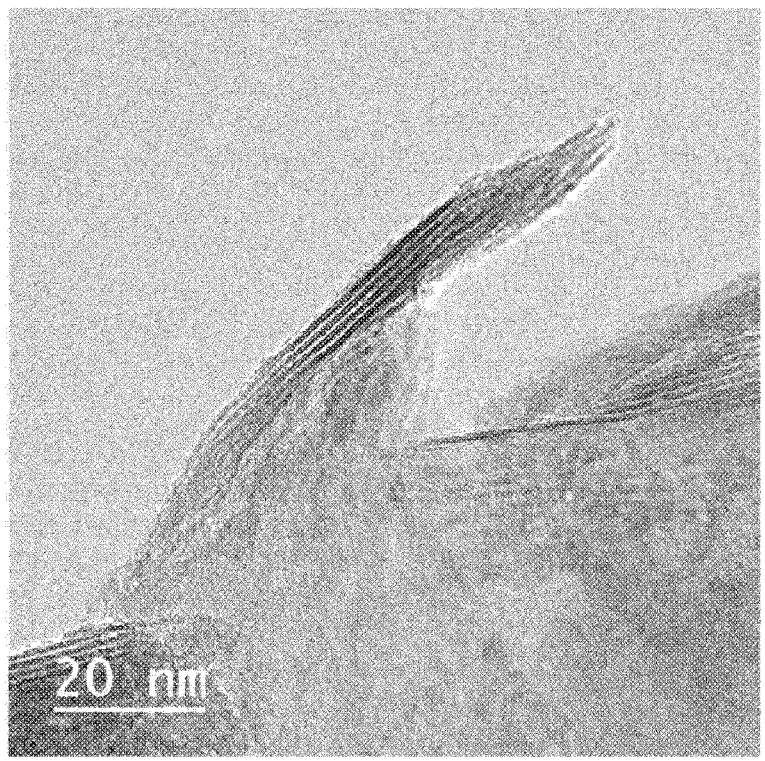
Figure 13C:
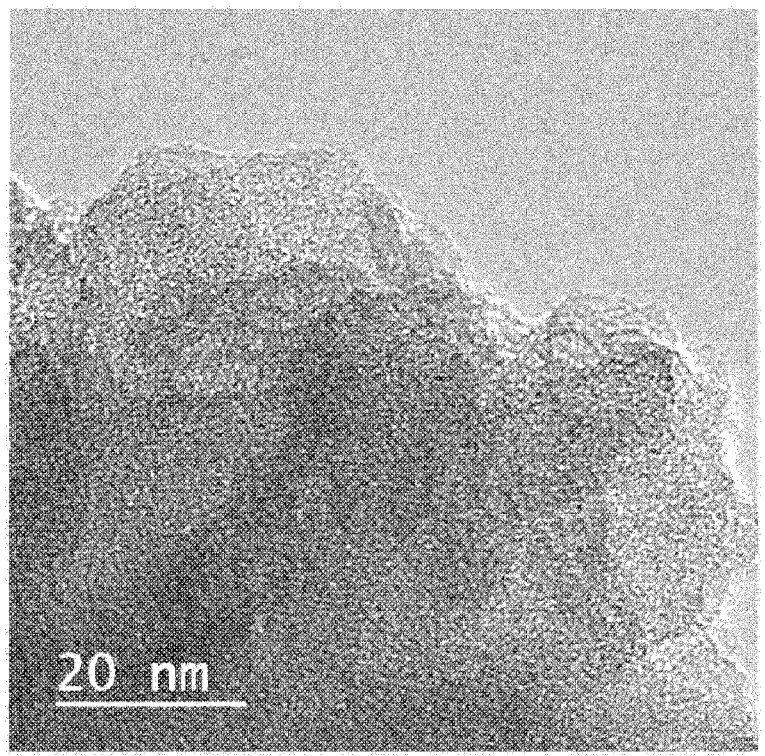

In addition, $Ti_3AlC_2$ used as the starting material in Example 2, an intermediate product after HF etching, and a final product $Ti_3C_2$ after a reduction treatment are subjected to TEM analysis, and observed images are shown in FIGS. 13a to 13c, respectively.

As shown in FIGS. 12a to 12c and FIGS. 13a to 13c, they maintain the two-dimensional structure even after a reduction treatment.

Evaluation Example 5

Figure 14:
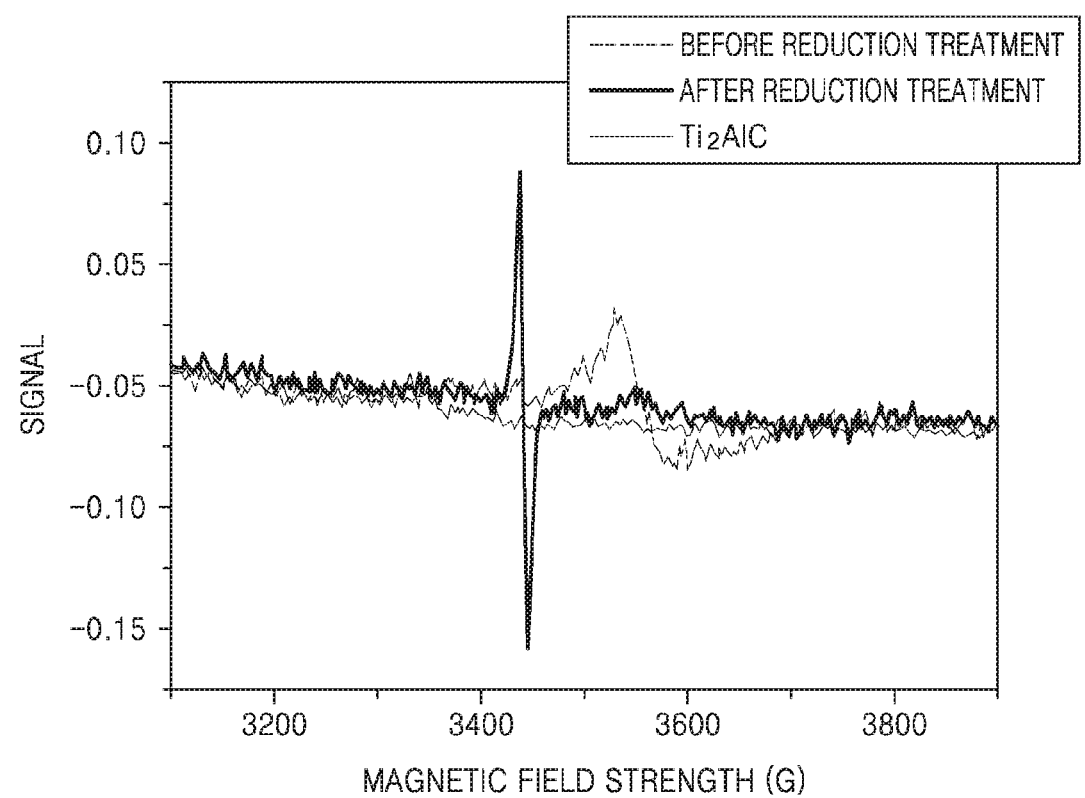
FIG. 14 shows result of electron paramagnetic resonance (EPR) analysis of $Ti_2AlC$ used as a starting material in Example 1, an intermediate product after HF etching, and a final product $Ti_2C$ after a reduction treatment.

Electron Paramagnetic Resonance (EPR) Analysis $Ti_2AlC$ used as the starting material in Example 1, an intermediate product after HF etching, and a final product $Ti_2C$ after a reduction treatment are subjected to EPR analysis, and the result is shown in FIG. 14.

Figure 15:
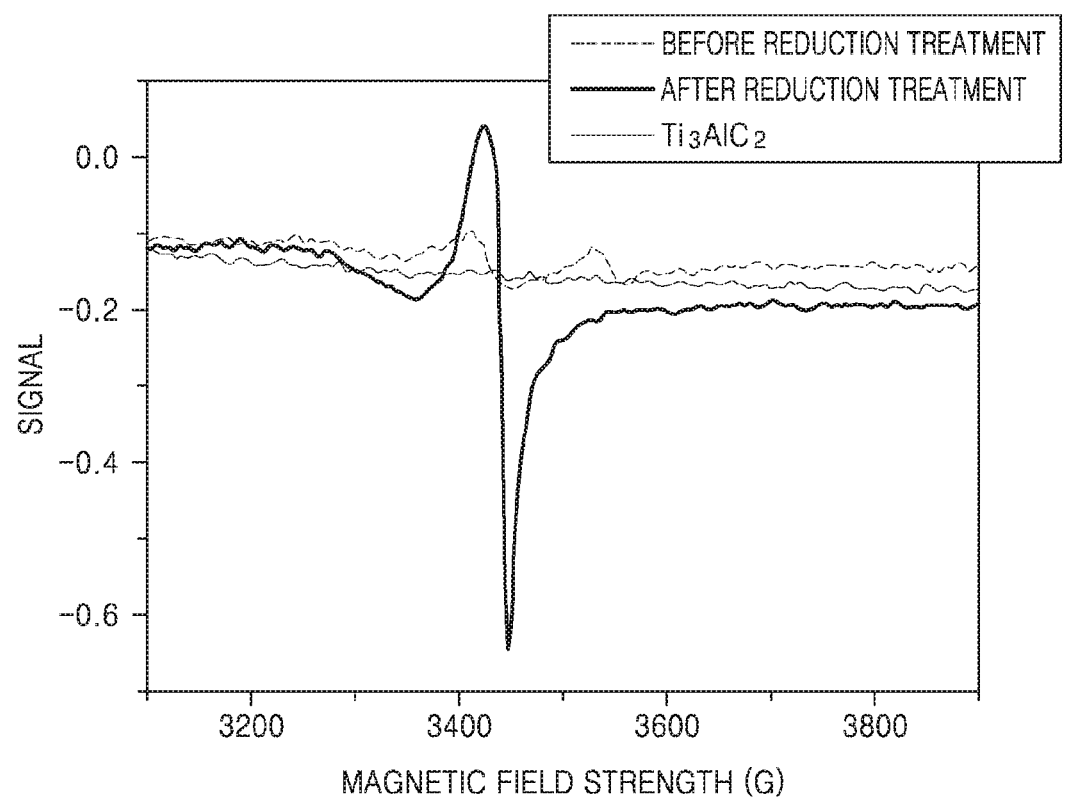
FIG. 15 shows result of EPR analysis of $Ti_3AlC_2$ used as a starting material in Example 2, an intermediate product after HF etching, and a final product $Ti_3C_2$ after a reduction treatment.

In addition, $Ti_3AlC_2$ used as the starting material in Example 2, an intermediate product after HF etching, and a final product $Ti_3C_2$ after a reduction treatment are subjected to EPR analysis, and the result is shown in FIG. 15.

As shown in FIGS. 14 and 15, the starting materials, $Ti_2AlC$ and $Ti_3AlC_2$ do not show a magnetic property, but show a broad weak magnetic property before a reduction treatment after HF etching, which may be generally inferred to be caused by structural defects due to a relatively strong acid treatment. After a reduction treatment with LiEDA, relatively strong peaks are observed near about 3450G, which is attributed to unpaired electrons of the 3d orbitals of Ti, indicating changes in the electron configuration by removal of functional groups from the surface of Ti.

As described above, example embodiments of the present inventive concepts have been described with reference to the drawings. However, these are for illustration purposes only, and those skilled in the art will appreciate that various modifications and other equivalent embodiments are possible from the embodiments. Therefore, the scope of the present inventive concepts should be defined by the accompanying claims.

It should be understood that example embodiments described herein should be considered in a descriptive sense only and not for purposes of limitation. Descriptions of features or aspects within each example embodiment should typically be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A method of manufacturing an MXene nanosheet, the method comprising:
   removing an A atomic layer from an inorganic compound having a formula of $M_{n+1}AX_n$ to form a nanosheet, the nanosheet having a formula of $M_{n+1}X_nT_s$; and
   reducing the nanosheet having the formula of $M_{n+1}X_nT_s$ to form the MXene nanosheet, the MXene nanosheet having a formula of $M_{n+1}X_n$,
   wherein M is at least one of Group 3 transition metal, Group 4 transition metal, Group 5 transition metal, and Group 6 transition metal,
   A is at least one of a Group 12 element, Group 13 element, Group 14 element, Group 15 element and Group 16 element,
   X is one of carbon (C), nitrogen (N) and a combination thereof,
   $T_s$ is one of oxide (O), epoxide, hydroxide (OH), alkoxide having 1-5 carbon atoms, fluoride (F), chloride (Cl), bromide (Br), iodide (I), and a combination thereof, and
   n is one of 1, 2 and 3.

2. The method of claim 1, wherein M is at least one of scandium (Sc), yttrium (Y), lutetium (Lu), titanium (Ti), zirconium (Zr), hafnium (Hf), vanadium (V), niobium (Nb), tantalum (Ta), chromium (Cr), molybdenum (Mo) and tungsten (W).

3. The method of claim 1, wherein A is at least one of aluminum (Al), silicon (Si), phosphorus (P), sulfur (S), gallium (Ga), germanium (Ge), arsenic (As), cadmium (Cd), indium (In), tin (Sn), thallium (Tl) and lead (Pb).

4. The method of claim 1, wherein the removing removes the atomic layer from the inorganic compound including at least one of $Ti_2CdC$, $Sc_2InC$, $Ti_2AlC$, $Ti_2GaC$, $Ti_2InC$, $Ti_2TlC$, $V_2AlC$, $V_2GaC$, $Cr_2GaC$, $Ti_2AlN$, $Ti_2GaN$, $Ti_2InN$, $V_2GaN$, $Cr_2GaN$, $Ti_2GeC$, $Ti_2SnC$, $Ti_2PbC$, $V_2GeC$, $Cr_2AlC$, $Cr_2GeC$, $V_2PC$, $V_2AsC$, $Ti_2SC$, $Zr_2InC$, $Zr_2TlC$, $Nb_2AlC$, $Nb_2GaC$, $Nb_2InC$, $Mo_2GaC$, $Zr_2InN$, $Zr_2TlN$, $Zr_2SnC$, $Zr_2PbC$, $Nb_2SnC$, $Nb_2PC$, $Nb_2AsC$, $Zr_2SC$, $Nb_2SC$, $Hf_2InC$, $Hf_2TlC$, $Ta_2AlC$, $Ta_2GaC$, $Hf_2SnC$, $Hf_2PbC$, $Hf_2SnN$, $Hf_2SC$ $Ti_3AlC_2$, $V_3AlC_2$, $Ti_3SiC_2$, $Ti_3GeC_2$, $Ti_3SnC_2$, $Ta_3AlC_2$, $Ti_4AlN_3$, $V_4AlC_3$, $Ti_4GaC_3$, $Ti_4SiC_3$, $Ti_4GeC_3$, $Nb_4AlC_3$, and $Ta_4AlC_3$.

5. The method of claim 1, wherein
   the removing forms the nanosheet having a formula $M_{n+1}X_n(OH)_xO_yF_z$; and
   x, y or z represents a molar ratio of each functional group present on the surface per 1 mole of $M_{n+1}X_n$.

6. The method of claim 1, wherein the removing forms the nanosheet having a two-dimensional layered structure.

7. The method of claim 1, wherein the removing removes the atomic layer under acidic conditions.

8. The method of claim 1, wherein the removing removes the atomic layer using an acid containing a fluorine atom.

9. The method of claim 1, wherein the removing removes the atomic layer using at least one of hydrofluoric acid (HF), $LiHF_2$, $NaHF_2$, $KHF_2$, lithium fluoride (LiF), sodium fluoride (NaF), magnesium fluoride ($MgF_2$), strontium fluoride ($SrF_2$), beryllium fluoride ($BeF_2$), calcium fluoride ($CaF_2$), ammonium fluoride ($NH_4F$), ammonium difluoride ($NH_4HF_2$), ammonium hexafluoroaluminate (($NH_4)_3AlF_6$), combinations thereof, and combinations with at least one of hydrochloric acid, sulfuric acid, and nitric acid.

10. The method of claim 1, wherein the removing removes the atomic layer at a temperature ranging from 20° C. to 800° C.

11. The method of claim 1, wherein the reducing reduces the nanosheet using one of a chemical, thermal, and thermochemical reduction process.

12. The method of claim 1, wherein the reducing reduces the nanosheet using a reducing agent.

13. The method of claim 12, wherein the reducing agent is a combination of alkali metal and one of amine and ammonia ($NH_3$).

14. The method of claim 13, wherein the alkali metal is at least one of lithium (Li), sodium (Na) and potassium (K).

15. The method of claim 13, wherein the amine is at least one of ethylene diamine, methyl amine, and diisopropylamine.

16. The method of claim 13, wherein the reducing reduces the nanosheet below a boiling point of amine or ammonia.

17. The method of claim 1, further comprising:
   neutralizing the MXene nanosheet using an acid after the reducing.

18. The method of claim 1, further comprising:
   drying the MXene nanosheet and an alcohol solvent at a temperature ranging from 100° C. to 200° C. under vacuum.

* * * * *